(12) United States Patent
Smith et al.

(10) Patent No.: US 9,687,913 B1
(45) Date of Patent: Jun. 27, 2017

(54) I. D. COLLET (71) Applicants: Lawrence D. Smith, Lincoln, ME (US); Lorraine D. Smith, Lincoln, ME (US)

(72) Inventors: Lawrence D. Smith, Lincoln, ME (US); Lorraine D. Smith, Lincoln, ME (US)

( * ) Notice: Subject to any disclaimer, the term of this patent is extended or adjusted under 35 U.S.C. 154(b) by 0 days.

(21) Appl. No.: 15/342,301

(22) Filed: Nov. 3, 2016

(51) Int. Cl.
*B23B 31/40* (2006.01)

(52) U.S. Cl.
CPC .... *B23B 31/4033* (2013.01); *B23B 2260/034* (2013.01); *Y10T 279/1008* (2015.01); *Y10T 279/1045* (2015.01); *Y10T 279/1087* (2015.01)

(58) Field of Classification Search
CPC ............ B23B 31/4006; B23B 31/4033; B23B 2260/034; Y10T 279/1004; Y10T 279/1008; Y10T 279/1037; Y10T 279/1041; Y10T 279/1045; Y10T 279/1087
See application file for complete search history.

(56) References Cited

U.S. PATENT DOCUMENTS

| | | | |
|---|---|---|---|
| 1,540,898 A | 6/1925 | Muller | |
| 3,017,192 A * | 1/1962 | Illowsek | B23B 31/4033 279/2.04 |
| 3,360,276 A * | 12/1967 | Peffer | B23B 31/4006 279/137 |
| 3,463,499 A | 8/1969 | Mott et al. | |
| 3,761,008 A * | 9/1973 | Goulder | B23B 31/4033 269/48.1 |
| 4,930,760 A | 6/1990 | Mirkovic | |
| 5,094,436 A | 3/1992 | Stephan, III | |
| 5,280,893 A | 1/1994 | Sixtensson | |
| 6,883,407 B2 * | 4/2005 | Smith | B23B 31/4033 279/155 |
| 7,958,619 B1 * | 6/2011 | Pletschet | B23B 31/402 279/130 |

* cited by examiner

*Primary Examiner* — Eric A Gates
(74) *Attorney, Agent, or Firm* — Suzanne Kikel, Patent Agent (57) ABSTRACT

An I.D. collet has a housing with a hollow bore and an undercut portion; a taper screw slidable into and out of the hollow bore of the housing and having a conical head; a spindle having a hollow bore in alignment with the hollow bore of the housing for receiving the conical head of the taper screw into and out of the hollow bore of the spindle such that the conical head enlarges the diameter of the spindle; and a draw nut assembly threadably connected to the taper screw and having tangs abutting the undercut portion of the housing when the spindle reaches a preset location in the hollow bore of the spindle to prevent further enlargement of the spindle when the tangs come into contact with the undercut portion of the housing.

7 Claims, 5 Drawing Sheets

I. D. COLLET

BACKGROUND OF THE INVENTION

1. Field of the Invention

The present invention relates to the general art of manufacturing, and to the particular field of an I.D. collet for chucking against an internal opening of a workpiece to hold that workpiece in position for machining, such as a lathe, milling or grinding.

2. Brief Description of the Prior Art

In manufacturing various types of workpieces having large openings there through, it frequently becomes necessary to chuck or grasp the workpiece internally. For example, in machining or grinding a tube or cylinder, it frequently is necessary to hold the cylinder internally rather than externally.

Conventional internal diameter chuck devices, commonly referred to as I.D. collet chucks, are made of a tube having a longitudinally slotted wall, with the internal opening in the tube being tapered. A drawbar inserted in the tube, and having a wedge-shaped outer surface, spreads the tube for grasping or chucking against the wall defining the opening in the workpiece.

Other conventional I.D. collet chucks are essentially as described above but with ramifications of the internal shape of the slotted collet tube, such as using a double taper, that is, tapering from both ends of the tube and using a double tapered drawbar arrangement.

While these prior devices have been in use for many years, they have significant drawbacks. In particular, the following problems have been noted by the inventor. If while using the prior art devices in a production environment and a part spins and scours the outside surface of the spindle or if it is an automatic machine and it misloads and activates the draw bar, then the pull shaft will keep pulling the taper screw back until it blows the locating diameter way over-size. Since the material of these prior devices is generally made of low carbon steel, they will not return to their original size. Accordingly, the workman or operator is now faced with making a new spindle and having a very expensive machine standing idle while the new I.D. collet chuck is being made. This generally results in a significant waste of time and expense.

There is therefore a need in the art to provide an improved I.D. collet which prevents the aforementioned damage to the present day I.D. collet devices.

There is a further need in the art to provide an improved I.D. collet which easily allows a spindle to be replaced with another spindle.

SUMMARY OF THE INVENTION

The present invention has met these needs. The present invention provides an I.D. collet having a positive stop which automatically stops a pull shaft of a machine such as a grinding, milling or lathing machine, from pulling a taper screw back into a spindle at a preset location whereby movement of the taper screw is stopped before the taper screw can damage the spindle.

The I.D. collet of the present invention has a spindle that is made of steel that is hardened and tempered to a Rockwell hardness of spring steel so that the internal surface thereof is resistant to nicks and dings and which internal surface has good wear characteristics. The I.D. collet has an outer surface on one end that is held very close, i.e. has close tolerances, so that any size spindle will fit into the housing and the concentricity will not be compromised from one spindle to another.

The spindle is inserted into a housing of the I.D. collet and the taper screw is inserted into the spindle and its threaded end engages the internal threads of a threaded rod of a draw nut assembly. The housing has an abutment wall assembly with an undercut portion and a concentric lip which receives the tangs of a draw nut assembly when the tangs are rotated about 90 degrees in the bore of the housing. When the threaded rod of the draw nut assembly is pulled back by a pull shaft on the machine, the tangs abut against the undercut portion which acts as a positive stop in the housing thereby preventing the tangs from traveling any further inside the housing and thus preventing the taper screw from moving further into the spindle.

The housing has two opposed slots at its one end such that the tangs of the draw nut assembly can be inserted into the housing. By turning the threaded rod of the draw nut assembly along with the tangs 90 degrees, the threaded rod and the tangs cannot be pulled back out of the housing because of the positive stop of the tangs against the undercut portion of the abutment wall assembly. A shaft supporting the tangs of the draw nut assembly has a flat surface for a set screw to come down through the housing to align and secure the shaft and therefore the tangs in the housing to keep the tangs from turning in radially in the housing.

A further set screw is provided on the housing in order to lock and unlock the spindle so that the operator of the machine can easily and efficiently change a spindle from one size to another size. The operator needs only to loosen this set screw on the housing, loosen the threaded screw of the spindle from the threaded rod of the draw nut assembly, pull the spindle out of the housing, and replace the spindle with another spindle.

These and other features and advantages of the present invention will be better appreciated and understood when the following description is read in light of the accompany drawings.

DETAILED DESCRIPTION OF THE INVENTION

The components in the figures are not necessarily to scale, emphasis instead being placed upon illustrating the principles of the invention. Moreover, in the figures, like referenced numerals designate corresponding parts throughout the different views.

Figure 1A:
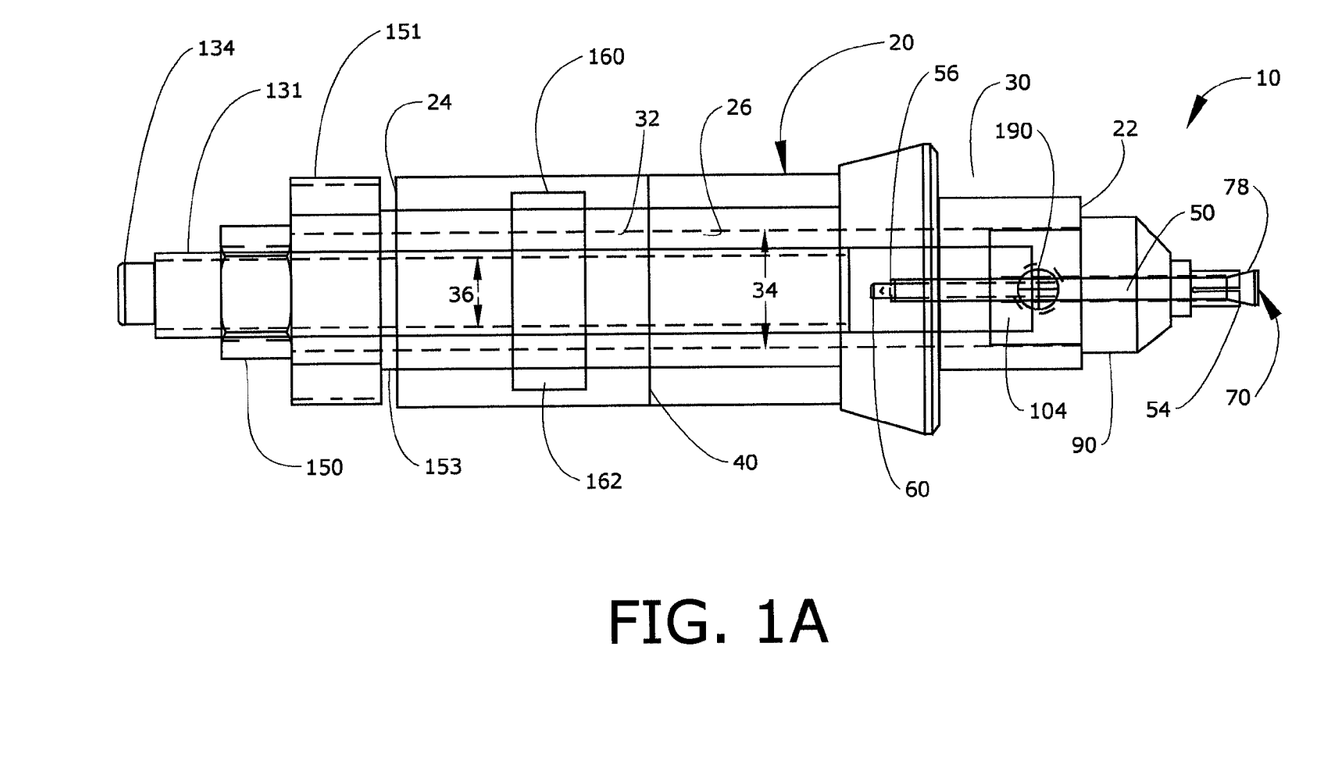
FIG. 1A is a schematic cross-sectional view of an I.D. collet embodying the present invention.
Figure 1B:
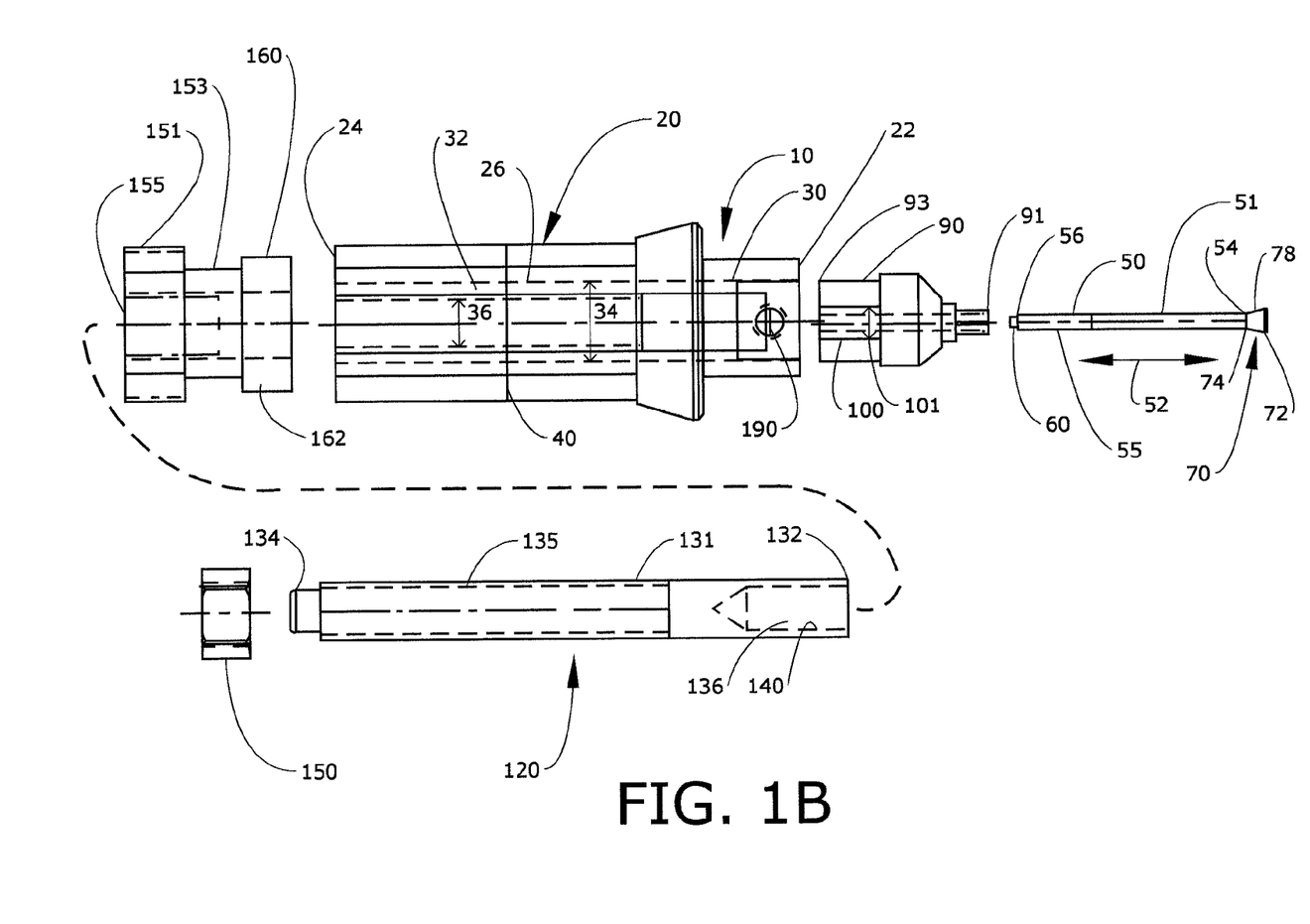
FIG. 1B is an exploded, schematic cross-sectional view of the I.D. collet of FIG. 1A with some of the components of the I.D. collet not being the same scale as those represented in FIG. 1A.

Referring to FIGS. 1A and 1B, the present invention is embodied in an I.D. collet 10 comprising a housing 20 having a first end 22, a second end 24, and a hollow bore 26 extending between first end 22 and second end 24 of housing 20. Hollow bore 26 of housing 10 includes a first portion 30 extending inwardly from first end 22 of housing 20 toward second end 24 of housing 20. Hollow bore 26 further includes a second portion 32 extending inwardly from second end 24 of housing 20 toward first end 22 of housing 20. First portion 30 of hollow bore 26 has an internal diameter indicated at numeral 34, and second portion 32 of hollow bore 26 has an internal diameter indicated at numeral 36. Internal diameter 34 of hollow bore 26 is greater than internal diameter 36 and an abutment wall assembly 40 is defined at the juncture of the first portion 30 and the second portion 32 of hollow bore 26 of housing 20. Abutment wall assembly 40 is indicated schematically in FIGS. 1A and 1B by a vertical line for clarity purposes, more about which is discussed herein below.

As shown best in FIG. 1A, a taper screw 50 is positioned in hollow bore 26 of housing 20 and is constructed to be movable into and out of hollow bore 26 as indicated by double-headed arrow 52 shown in FIG. 1B. Referring particularly to FIG. 1B, taper screw 50 comprises a first end 54 and a second end 56. As shown in the assemblage of the components of the I.D. collet 10 of FIG. 1A, first end 54 of taper screw 50 is located outside of hollow bore 26 adjacent to first end 22 of housing 20, and second end 56 of taper screw 50 is located inside hollow bore 26 of housing 20.

As shown in FIG. 1B, the shaft of taper screw 50 comprises a smooth portion 51 adjacent to first end 54; a first threaded portion 55 adjacent to smooth portion 51 which has no threads; and a second threaded portion 60 adjacent to second end 56 of taper screw 50. As best shown in FIG. 1B, the diameter of first threaded portion 55 is greater than the diameter of second threaded portion 60 of taper screw 50, more about which is discussed further herein below.

As shown in FIG. 1A, when taper screw 50 is assembled in housing 20, second threaded portion 60 of taper screw 50 is spaced away from abutment wall assembly 40 of housing 20 of I.D. collet 10. Particularly referring to FIG. 1B, taper screw 50 further comprises a conical head 70 adjacent to smooth portion 51. Conical head 70 has an outer tapered surface 78 extending between a first end 72 and a second end 74 of conical head 70. As best shown in FIG. 1B, the diameter of first end 72 is greater than the diameter of second end 74 of conical head 70. It is to be appreciated that since conical head 70 is part of taper screw 50, conical head 70 moves with taper screw 50 upon movement of taper screw 50 into and out of hollow bore 26 of housing 20.

Still referring to FIGS. 1A and 1B, I.D. collet 10 further comprises a spindle 90 which as particularly shown in FIG. 1A, is securely mounted in first end 22 of housing 20. Spindle 90 has a first portion 91 which has radial slots arranged around its outer surface, a second portion 93, and a hollow bore 100 (FIG. 1B) which slidably accommodates taper screw 50. Hollow bore 100 of spindle 90 has an internal diameter indicated at numeral 101 in FIG. 1B. In operation, as taper screw 50 slides into and out of spindle 90, its conical head 70 moves into and out of hollow bore 100 at the first portion 91 of spindle 90. The diameter of the second end 74 of conical head 70 is smaller than the internal diameter 101 of bore 100 of spindle 90, while the diameter of the first end 72 of conical head 70 is greater than the internal diameter 101 of bore 100 of spindle 90. Outer tapered surface 78 of conical head 70 slidably engages into spindle 90 and enlarges first portion 91 via radial slots in first portion as conical head 70 of taper screw 50 moves into the hollow bore 100 of spindle 90 in a manner well-known to those skilled in the art.

Spindle 90 further comprises two opposed planar portions, one of which is indicated at reference numeral 104 in FIG. 1A, the purpose of which is discussed further herein below. Preferably, at least spindle 90 is made of steel that is hardened and tempered to a Rockwell hardness of spring steel so that its internal surface is resistant to nicks and dings and which internal surface has good wear characteristics.

Still referring particularly to FIG. 1B, collet 10 further comprises a draw nut assembly 120 comprising a threaded rod 131, a draw nut 150, a cap 151 with a shaft 153, and two spaced apart tangs 160 and 162 welded at the end of shaft 153. Cap 151, shaft 153 and tangs 160 and 162 have a hollow bore 155 (FIG. 1B) for receiving threaded rod 131 for assemblage of cap 151, shaft 153 and tangs 160, 162 onto threaded rod 131. As is apparent, the inner diameters of hollow bore 155 of cap 151 and shaft 153 have inner threads for mounting cap 151 and shaft 153 and therefore tangs 160, 162 onto the threads of threaded rod 131. Cap 151, shaft 153 and tangs 160, 162 are threadedly secured to threaded rod 131 and held in place in housing 20 by draw nut 150.

Still referring particularly to FIG. 1B, threaded rod 131 has a first end 132, a second end 134, a threaded portion 135 extending a substantial length along threaded rod 131, and a blind-ended bore 136 defined in rod 131 adjacent to first end 132 of rod 131 and extending toward second end 134 of rod 131. Internal threads 140 are located in blind-ended bore 136 of rod 131. These internal threads 140 in blind-ended bore 136 are sized and shaped to threadably engage the external threads on first and second threaded portions 55, 60 of taper screw 50 in order to secure taper screw 50 to threaded rod 131 of draw nut assembly 120 when draw nut assembly 120 is assembled in hollow bore 26 of housing 20 of FIG. 1A. Threaded rod 131 is represented in FIG. 1B as being greater in scale than taper screw 50, however, in the invention, threaded rod 131 and taper screw 50 are the same scale with the threaded portions 55, 60 of taper screw 50 fitting into blind-ended bore 136 and engaging internal threads 140 of threaded rod 131.

Still referring particularly to FIG. 1B, and as stated herein above, draw nut assembly 120 further comprises a draw nut 150 having internal threads which engage the external threads of threaded portion 135 of threaded rod 131 when draw nut 150 is threaded onto threaded rod 131.

Figure 2:
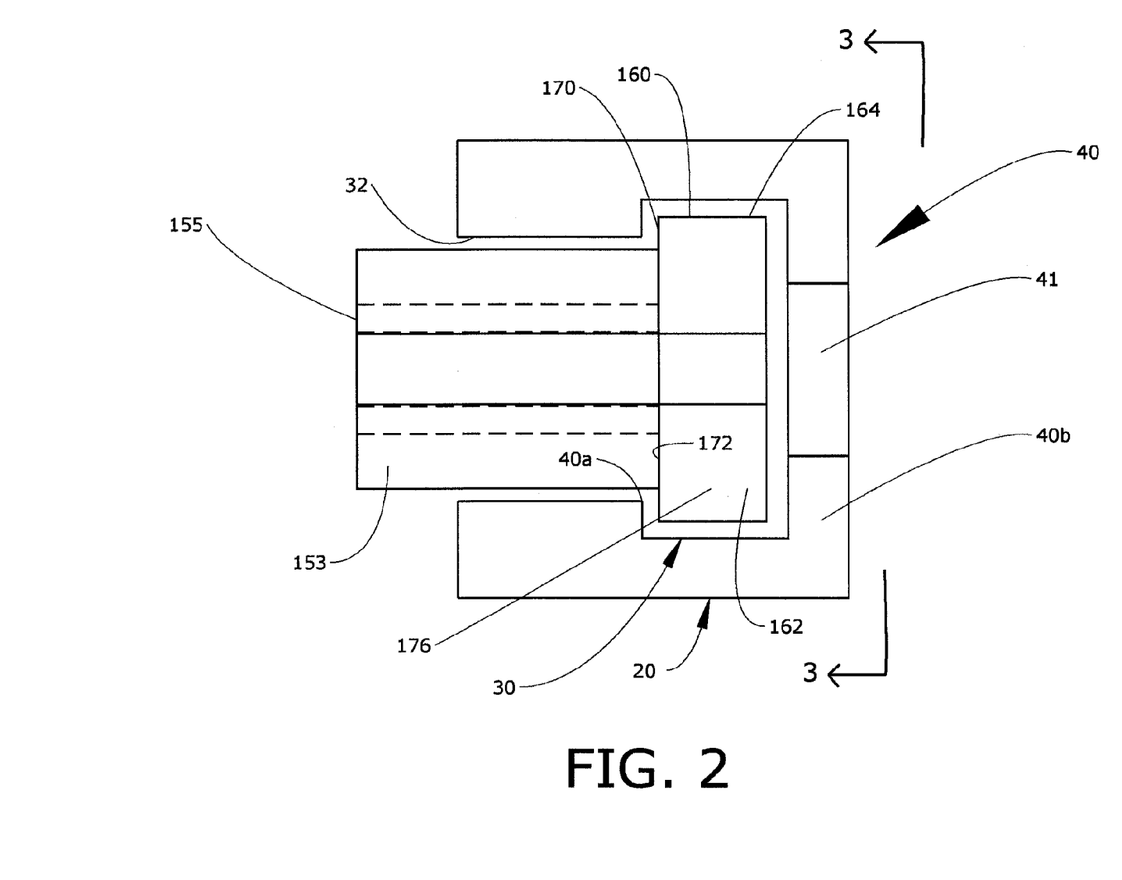
FIG. 2 is a schematic partial side view of the inside of the housing with the tangs of a draw nut assembly located adjacent to an undercut portion of an abutment wall assembly in the hollow bore of the housing.
Figure 3:
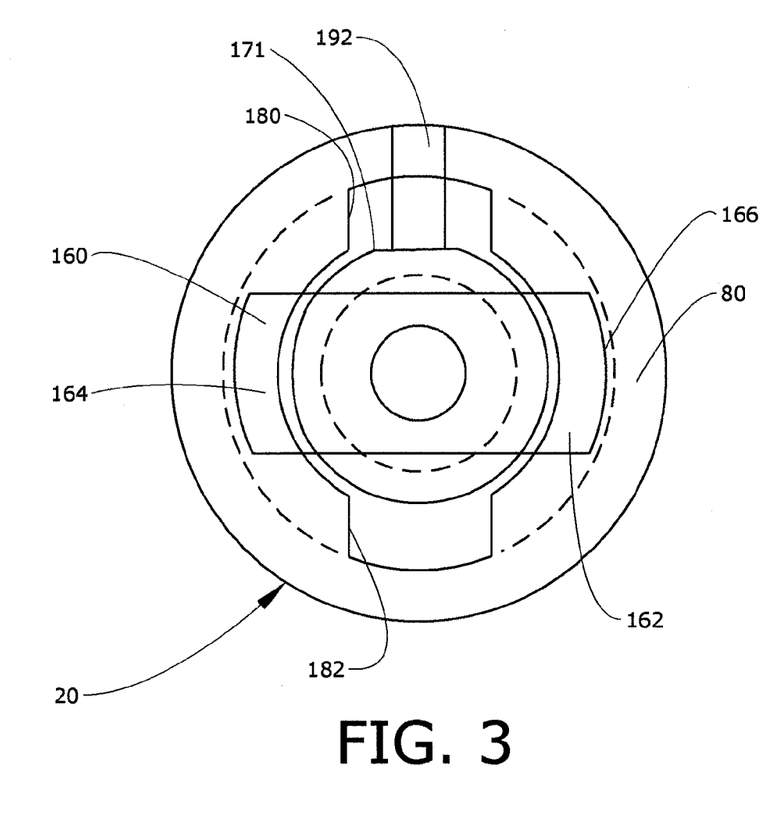
FIG. 3 is a schematic end view of the portion of the I.D. collet taken along lines 3-3 of FIG. 2 illustrating tangs rotated 90 degrees and out of sliding alignment with the axial slots in the housing wherein the tangs are in position to abut an undercut portion of an abutment wall assembly of the housing so that further inward axial movement of the conical head of a taper screw with respect to the spindle is prevented by abutting contact of the tangs with the undercut portion.
Figure 4:
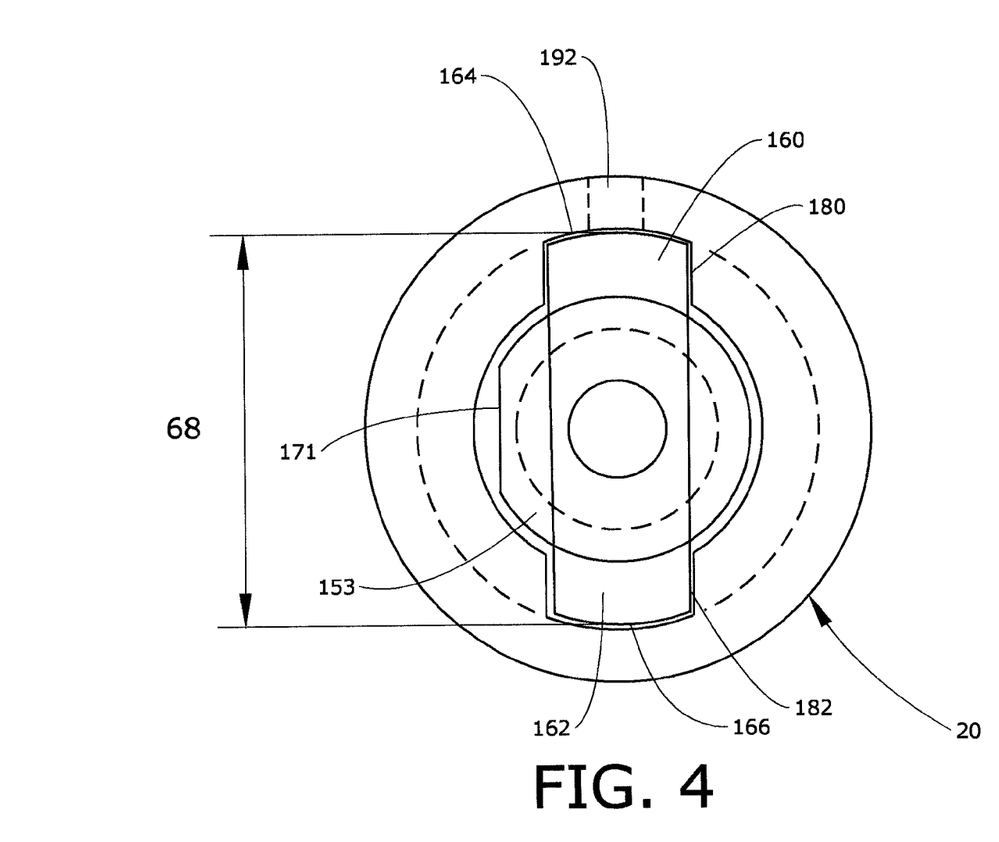
FIG. 4 is a schematic end view of the portion of the I.D. collet similar to that of FIG. 3 with the tangs rotated 90 degrees and such as to be in sliding alignment in the axial slots in the housing so that the draw nut assembly can be moved into and out of the housing.

Referring particularly to FIGS. 2, 3 and 4, shaft 153 of draw nut assembly 120 contains two opposed tangs 160 and 162 which extend radially outwardly from the threaded rod 131. Tangs 160 and 162 have an outer surface 164, 166 respectively. As shown in FIG. 4, outer surfaces 164 and 166 are spaced apart from each other by a distance indicated by reference numeral 168. This distance 168 is slightly less than the internal diameter 34 of the first portion 30 of hollow bore 26 of housing 20 and greater than the internal diameter 36 of the second portion 32 of the hollow bore 26 of housing 20.

Referring particularly to FIG. 2, tangs 160, 162 have an abutment wall-engaging surface 170, 172 respectively which abuts the undercut portion 40a of abutment wall assembly 40 of housing 20 to stop movement of the draw nut assembly 120 towards the second end 24 (FIG. 1A) of housing 20 and to stop movement of conical head 70 of taper screw 50 into the hollow bore 100 of spindle 90 when tangs 160, 162 are in abutting contact with the undercut portion 40a of housing 20 thereby to stop the enlargement of spindle 90 when tangs 160, 162 come into abutting contact with the undercut portion 40a of housing 20 (FIG. 2). As can be appreciated from FIG. 2, tangs 160, 162 are prevented from moving in an opposite direction towards spindle 90 via a concentric lip 40b extending around the inner diameter of housing 20 and spaced away from undercut portion 40a and formed in the hollow bore 26 of housing 20. Concentric lip 40b has a hollow bore 41 which is in alignment with hollow bore 26 of housing 20 so that threaded rod 131 of draw nut assembly 120 can extend there through for its engagement with taper screw 50.

Referring particularly to FIGS. 3 and 4, housing 20 has two opposed axial slots 180 and 182 defined therein and extending lengthwise in hollow bore 26 of housing 20 and contiguous with the spatial area formed between undercut portion 40a and concentric lip 40b of abutment wall assembly 40 which receives tangs 160, 162 (FIG. 2). Preferably, axial slots 180, 182 are sized and shaped to slidably receive the abutment wall-engaging surface 170, 172 of tangs 160, 162 respectively of draw nut assembly 120. Draw nut assembly 120 is rotatably accommodated in hollow bore 26 of housing 20 so that tangs 160, 162 can be rotated out of sliding engagement with axial slots 180, 182 as can be appreciated when comparing FIG. 3 and FIG. 4.

As stated herein above, FIG. 3 illustrates tangs 160, 162 as being rotated 90 degrees so as to be out of sliding alignment with axial slots 180, 182 of hollow bore 26 of housing 20 and as being in a position to abut undercut portion 40a (FIG. 2) so that further inward movement of the conical head 70 of threaded screw 50 with respect to spindle 90 is prevented. That is, the abutment of tangs 160, 162 against undercut portion 40a (FIG. 2) prevents further movement of conical head 70 of threaded screw 50 into spindle 90, thereby preventing spindle 90 from being damaged. As stated herein above, FIG. 4 shows tangs 160, 162 oriented such as to be slidingly received in axial slots 180, 182 of hollow bore 26 of housing 20 so that threaded rod 131 of draw nut assembly 120 can be moved into and out of housing 20. Threaded rod 131, draw nut 150, cap 151, shaft 153, and tangs 160, 162 are inserted into and removed from housing 20 as a unit.

As shown best in FIGS. 3 and 4, shaft 153 of draw nut assembly 120 has a flat surface 171 so that a set screw (not shown) can be inserted in aperture 192 of housing 20 to align and secure shaft 153 in housing 20 in order to keep shaft 153, cap 151 and tangs 160, 162 from turning radially in housing 20.

Referring again to FIGS. 1A and 1B, housing 20 further comprises set screw 190, which is threadably mounted in housing 20 to extend through the housing and into abutting contact with one of the planar portions 104 (FIG. 1) on spindle 90 to hold the spindle in place in the housing. The operator of the machine needs only to loosen set screw 190 on the housing, unscrew taper screw 50 from threaded rod 131 of draw nut assembly 120, remove spindle 90 from housing 20, and insert a new spindle in housing 20.

As can be understood from the foregoing, movement of conical head 70 of taper screw 50 into spindle 90 is stopped when the abutment wall-engaging surface 170, 172 of tangs 160, 162 contact abutment wall assembly 40 formed in hollow bore 26 of housing 20 thereby preventing further enlargement of spindle 90.

It is to be further appreciated that appropriate sized Allen wrenches may be used to tighten and loosen the set screws and taper screw 50. It is to be further appreciated that cap 151 preferably contains external threads for engagement of cap 151 with a pull shaft of a machine, i.e. lathing, milling, and grinding machines, or the like in a manner well known to those skilled in the art.

In order to replace spindle 90, the operator of the machine merely needs to loosen set screw 190 from housing 20, unscrew taper screw 50 from threaded rod 131 of draw nut assembly 120, pull spindle 90 out of housing 20, insert another spindle into housing 20, and secure this second spindle in housing 20 through a reverse operation. In this reverse operation, threaded portion 60 of taper screw 50 engages the internal threads 140 of blind-ended bore 136 of threaded rod 131 of draw nut assembly 120.

As can be appreciated from the above teachings, cap 151, shaft 153, and tangs 160 and 162 preferably are a unit and are threaded as such onto rod 131. Draw nut 150 abuts against cap 151 to retain cap 151, shaft 153 and tangs 160 and 162 on threaded rod 131 so that draw nut assembly 120 can be inserted into housing 120 as a unit. For this insertion of draw nut assembly 120 as a unit into housing 20, tangs 160 and 162 are aligned with slots 180 and 182 of housing 20 (FIG. 4), threaded rod 131 is pushed into hollow bore 32 of housing 20 and rotated 90 degrees so that tangs 160, 162 are arranged between the undercut portion 40a and concentric lip 40a of abutment wall 40 in housing 20 so that threaded rod 131 cannot be pulled out of housing 20. Threaded rod 131 is then secured in housing 20 via engagement of taper screw 50 with threaded rod 131 and as stated herein above, a further set screw (not shown) is inserted into aperture 192 (FIGS. 3 and 4) and pushed against flat surface 172 of shaft 153. Prior to threaded rod 131 being secured in housing 20 and prior to a set screw being inserted into aperture 192, tangs 160 and 162 can only be axially moved with reference to FIG. 2 within the limited space between undercut portion 40a and concentric ring 40b of abutment wall assembly 40. In this movement of tangs 160 and 162 between undercut portion 40a and concentric ring 40b of abutment wall assembly 40, draw nut assembly 120 and taper screw 50 can move axially within housing 20 as a unit since taper rod is threaded to threaded rod 131. Cap 151 is moved axially inwardly relative to housing 20 to engage second end 24 of housing, and a set screw is inserted into aperture 192 to secure shaft 153 with tangs 160, 162 between undercut portion 40a and concentric lip 40b of abutment wall assembly 40 as shown in FIG. 2.

While the present invention has been described in connection with the embodiments of the various figures, it is to be understood that other similar embodiments may be used or modifications and additions may be made to the described embodiment for performing the same function of the present invention without deviating there from. Accordingly, it is intended by the appended claims to cover all such changes and modifications as come within the spirit and scope of the invention. Even though two tang members 160, 162 are provided in the drawings, it is to be appreciated that only one such tang member may be provided.

What is claimed is:
1. An I.D. collet, comprising:
 (a) a housing having a first end, a second end, and a hollow bore extending between the first end and the second end;

the hollow bore having a first portion and a second portion; and an abutment wall assembly defined at the juncture of the first portion and the second portion of the hollow bore and having an undercut portion and a concentric lip;

(b) a taper screw slidably located in the hollow bore of the housing at the first end of the housing and structured to be movable into and out of the hollow bore of the housing;

the taper screw having a conical head located outside of the hollow bore of the housing adjacent to the first end of the housing and a second end with external threads and located inside the hollow bore of the housing;

the conical head of the taper screw having a first end with a first end diameter and a second end with a second end diameter, the second end diameter being less than the first end diameter with the conical head having an outer surface which tapers from the first end of the conical head to the second end of the conical head;

(c) a spindle mounted in the housing adjacent to the first end of the housing, the spindle having a hollow bore with an internal diameter for slidably receiving the taper screw for movement into and out of the spindle with the conical head moving into and out of the hollow bore of the spindle, the second end diameter of the conical head being less than the spindle bore internal diameter and the first end diameter of the conical head being greater than the spindle internal diameter, the outer surface of the conical head slidably engaging the spindle and enlarging the spindle as the conical head moves into the spindle hollow bore and into the housing; and (d) a draw nut assembly comprising a threaded rod, a cap, a shaft connected to the cap, and at least two tangs connected to the shaft;

the threaded rod having a first end and a second end, the first end having a blind-ended bore extending toward the second end of the threaded rod and having internal threads sized and shaped to threadably receive the external threads of the taper screw of the spindle to attach the taper screw to the threaded rod of the draw nut assembly inside the housing;

the cap, shaft and at least two tangs being mounted on the threaded rod; and the two opposed tangs extending radially outwardly from the threaded rod and received in the second portion of the hollow bore of the housing, each of the tangs having a surface structured to abut the undercut portion of the abutment wall assembly in the hollow bore of the housing to stop movement of the tangs towards the second end of the housing and to stop movement of the conical head of the taper screw into the hollow bore of the spindle and enlargement of the spindle.

2. The I.D. collet of claim 1, wherein the second portion of the hollow bore of the housing has at least two opposed axial slots extending substantially along the axial length of the second portion of the hollow bore of the housing and adjacent to the abutment wall assembly of the housing, the axial slots being sized to slidably accommodate the opposed tangs of the draw nut assembly, the draw nut assembly being rotatably accommodated in the hollow bore of the housing so the opposed tangs can be rotated into and out of sliding engagement in the axial slots of the housing.

3. The I.D. collet of claim 2, further including a set screw threadably extending into the housing and into abutting contact with the spindle to hold the spindle in place in the housing.

4. The I.D. collet of claim 3 further including at least one planar portion on the spindle structured to be in abutting contacted with the set screw when the spindle is held in place in the housing.

5. The I.D. collet of claim 4 wherein the spindle is made of hardened and tempered steel.

6. I.D. collet comprising:

(a) a housing having a first end, a second end, a hollow bore extending between the first end and the second end, the hollow bore having a first portion extending from the first end of the housing toward the second end of the housing, a second portion extending from the second end of the housing toward the first end of the housing, the first portion of the hollow bore having a first internal diameter, the second portion of the hollow bore having a second internal diameter, the first internal diameter being larger than the second internal diameter;

the housing having an abutment wall assembly defined at the juncture of the first and second portions of the hollow bore and having an undercut portion and a concentric lip;

(b) a taper screw having a conical head with an apex and a base, (c) a spindle mounted in the housing adjacent to the first end of the housing, the spindle having a hollow bore which slidably accommodates the taper screw for movement into and out of the spindle with the conical head of the taper screw moving into and out of the hollow bore of the spindle and with the apex of the conical head leading the movement of the conical head into the hollow bore of the spindle, the base of the conical head of the taper screw having a diameter larger than the internal diameter of the hollow bore of the spindle so that the conical head contacts the spindle adjacent to the hollow bore of the spindle and enlarges the diameter of the spindle as the conical head moves into the hollow bore of the spindle; and (d) a draw nut assembly threadably connected to the taper screw, and including at least one tang constructed to abut against the undercut portion of the abutment wall assembly of the housing when the spindle has reached a predetermined location in the housing to prevent further enlargement of the spindle.

7. I.D. collet comprising:

(a) a housing having a hollow bore extending through the housing, the hollow bore having a first portion and a second portion with internal diameters, the internal diameter of the first portion being greater than the internal diameter of the second portion and forming an abutment wall assembly having an undercut portion and a concentric lip;

(b) a taper screw having a conical head with an apex and a base;

(c) a spindle mounted in the housing and having a hollow bore in alignment with the hollow bore of the housing for receiving the taper screw with the conical head of the taper screw moving into and out of the hollow bore of the spindle and with the apex of the conical head leading the movement of the conical head into the hollow bore of the spindle and with the base of the conical head having a diameter greater than the internal diameter of the hollow bore of the spindle such that the conical head of the spindle contacts the spindle to enlarge the internal diameter of the spindle as the conical head moves into the hollow bore of the spindle; and (d) a draw nut assembly threadably connected to the taper screw, and including at least one tang member constructed to abut against the undercut portion of the abutment wall assembly of the housing when the spindle has reached a predetermined location in the hollow bore of the housing to prevent further enlargement of the spindle.

\* \* \* \* \*